United States Patent
Liu et al.

(10) Patent No.: US 8,902,478 B2
(45) Date of Patent: Dec. 2, 2014

(54) IMAGE SCANNING DEVICE

(71) Applicants: Lite-On Electronics (Guangzhou) Limited, Guangzhou (CN); Lite-On Technology Corp., Taipei (TW)

(72) Inventors: Chun-Liang Liu, Taipei (TW); Ta-Yi Lee, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 0 days.

(21) Appl. No.: 13/800,388

(22) Filed: Mar. 13, 2013

(65) Prior Publication Data

US 2014/0029066 A1 Jan. 30, 2014

(30) Foreign Application Priority Data

Jul. 24, 2012 (CN) .................... 2012 2 0360249 U

(51) Int. Cl.
*H04N 1/04* (2006.01)
*H04N 1/10* (2006.01)

(52) U.S. Cl.
CPC .......... *H04N 1/04* (2013.01); *H04N 2201/0456* (2013.01); *H04N 1/1065* (2013.01); *H04N 2201/0434* (2013.01)
USPC ........... 358/474; 358/497; 358/496; 399/367; 271/10.13

(58) Field of Classification Search
CPC ............ H04N 2201/008; H04N 1/193; H04N 2201/0434; H04N 1/1043; H04N 2201/0081
USPC ......... 358/474, 496, 498, 497, 506, 493, 408; 399/367, 362; 271/127, 274, 225, 271/10.13, 209, 121, 8.1
See application file for complete search history.

(56) References Cited

U.S. PATENT DOCUMENTS

| | | | |
|---|---|---|---|
| 6,377,382 B1* | 4/2002 | Kato | 359/212.1 |
| 7,116,439 B2* | 10/2006 | Sasaki et al. | 358/1.18 |
| 7,268,923 B2* | 9/2007 | Schroath et al. | 358/474 |
| 7,477,426 B2* | 1/2009 | Guan et al. | 358/474 |
| 7,538,915 B2* | 5/2009 | Lee et al. | 358/497 |
| 7,551,333 B2* | 6/2009 | Chien | 358/497 |
| 7,583,416 B2* | 9/2009 | Brugger et al. | 358/474 |
| 7,936,486 B2* | 5/2011 | Shin | 358/474 |
| 8,169,672 B2* | 5/2012 | Yamauchi et al. | 358/475 |
| 8,237,996 B2* | 8/2012 | Takeuchi | 358/474 |
| 8,274,712 B2* | 9/2012 | Sheng et al. | 358/474 |
| 8,451,516 B2* | 5/2013 | Chen | 358/497 |
| 8,531,732 B2* | 9/2013 | Park | 358/3.27 |

* cited by examiner

*Primary Examiner* — Negussie Worku
(74) *Attorney, Agent, or Firm* — Rosenberg, Klein & Lee

(57) ABSTRACT

An image scanning device includes a bottom wall, a surrounding wall extending upwardly from the bottom wall, a frame connected to the surrounding wall and having a first side plate, and a transparent panel fixed to the frame and having a lateral side supported by an upper part of the first side plate. A contact image sensor module is disposed on the bottom wall transverse to the first side plate, and includes a housing having a first short side wall spaced apart from the first side plate by a first distance less than or equal to 2 mm, and a plurality of sensors, one of which that is closest to the first short side wall is spaced apart from an outer surface of the first short side wall by a second distance less than or equal to 2.5 mm.

3 Claims, 8 Drawing Sheets

IMAGE SCANNING DEVICE

CROSS REFERENCE TO RELATED APPLICATION

This application claims priority of Chinese Patent Application No. 201220360249.X, filed on Jul. 24, 2012.

1. Field of the Invention

The invention relates to an image scanning device, more particularly to an image scanning device utilizing a contact image sensor (CIS) module.

2. Description of the Related Art

Referring to FIGS. 1 and 2, a conventional flatbed image scanning device 1 is shown to include a base 10, a platform 11 mounted to and covering the base 10, and a contact image sensor (CIS) module 12 disposed on the base 10. The platform 11 has a surrounding wall 111, an annular flange 112 extending inwardly and horizontally from a top periphery of the surrounding wall 111, and a transparent panel 113 fixed in a receiving space defined by the surrounding wall 111 and the annular flange 112. The CIS module 12 has a generally rectangular housing 121, and a sensor assembly 123 disposed in the housing 121 and including a plurality of side-by-side sensors 122. An outer surface of a short side wall 124 of the housing 121 is spaced apart from an inner surface of the surrounding wall 111 of the platform 11 by a first distance (D1) which is at least 3 to 5 mm. The length of the housing 121 is about 236 to 240 mm. The sensor assembly 123 has a total length of about 216 to 218 mm. An outermost one of the sensors 122 of the sensor assembly 123 is spaced apart from the outer surface of the short side wall 124 of the housing 121 by a second distance (D2) which is about 9 to 10 mm. The surrounding wall 111 has a thickness (D3) of about 2.5 to 3 mm. A distance (D) from the outer surface of the surrounding wall 111 to the outermost one of the sensors 122 of the sensor assembly 123 is the sum of the first distance (D1), the second distance (D2) and the thickness (D3), and is close to about 20 mm.

Hence, as shown in FIG. 2, when a border of the content of a to-be-scanned page of a book 4 is spaced apart from the outer surface of the surrounding wall 111 by a distance (s) which is shorter than the distance (D), the content of the to-be-scanned page that is near the border cannot be scanned by the sensor assembly 123. Further, because the transparent panel 113 is lower than the annular flange 112 so that a sectional difference (D4) is formed between the transparent panel 113 and the annular flange 112, and because the CIS module 12 has a short focal length, a portion of the page of the book 4 that is proximate to the sectional difference (D4) cannot be laid flatly on the transparent panel 113 and cannot be fully scanned to form an image, thereby easily causing some scan distortion.

SUMMARY OF THE INVENTION

Therefore, an object of the present invention is to provide an image scanning device that is capable of overcoming the aforesaid drawback of the prior art.

According to this invention, an image scanning device comprises a base, a platform, and a contact image sensor module. The base includes a bottom wall and a surrounding wall extending upwardly from a peripheral edge of the bottom wall. The platform is mounted to and covers the base, and includes a frame connected to the surrounding wall, and a transparent panel fixed to the frame. The frame includes a first side plate. The transparent panel has a lateral side supported by an upper part of the first side plate. The contact image sensor module is disposed on the bottom wall transverse to the first side plate, and includes a housing and a sensor assembly disposed in the housing. The housing has a first short side wall that is proximate to and that is spaced apart from the first side plate by a first distance less than or equal to 2 mm. The sensor assembly includes a plurality of sensors that are arranged in a row. One of the sensors which is closest to the first short side wall is spaced apart from an outer surface of the first short side wall by a second distance less than or equal to 2.5 mm.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

The above-mentioned and other technical contents, features, and effects of this disclosure will be clearly presented from the following detailed description of two preferred embodiments in coordination with the reference drawings.

The image scanning device according to this invention may be applied to a flatbed scanner (FB Scanner) or a multi-function printer (MFP) that utilizes a contact image sensor (CIS). The preferred embodiments of this invention applied to a flatbed scanner (FB Scanner) will be described below.

Figure 3:
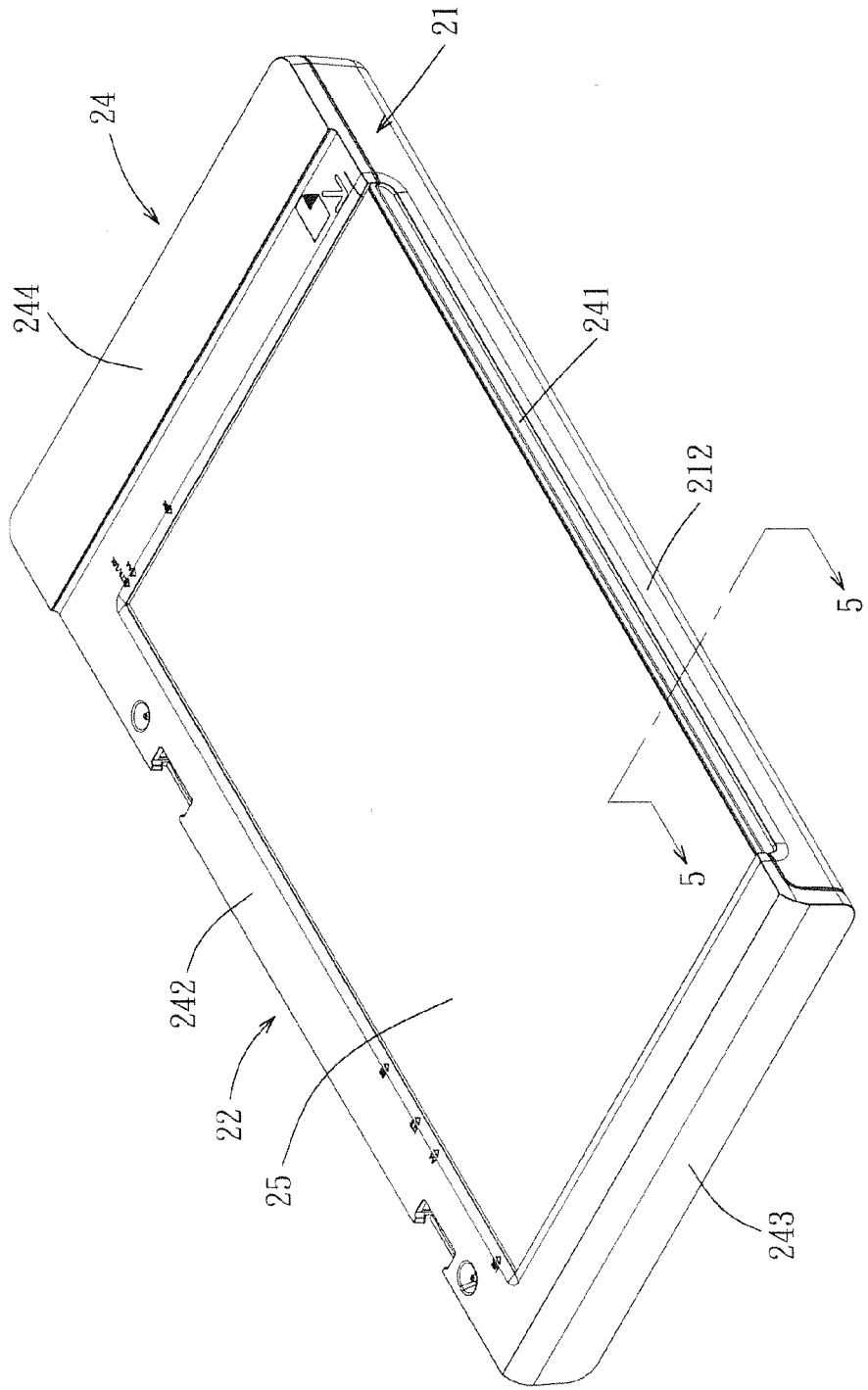
FIG. 3 is a perspective view of an image scanning device according to the first preferred embodiment of this invention.
Figure 4:
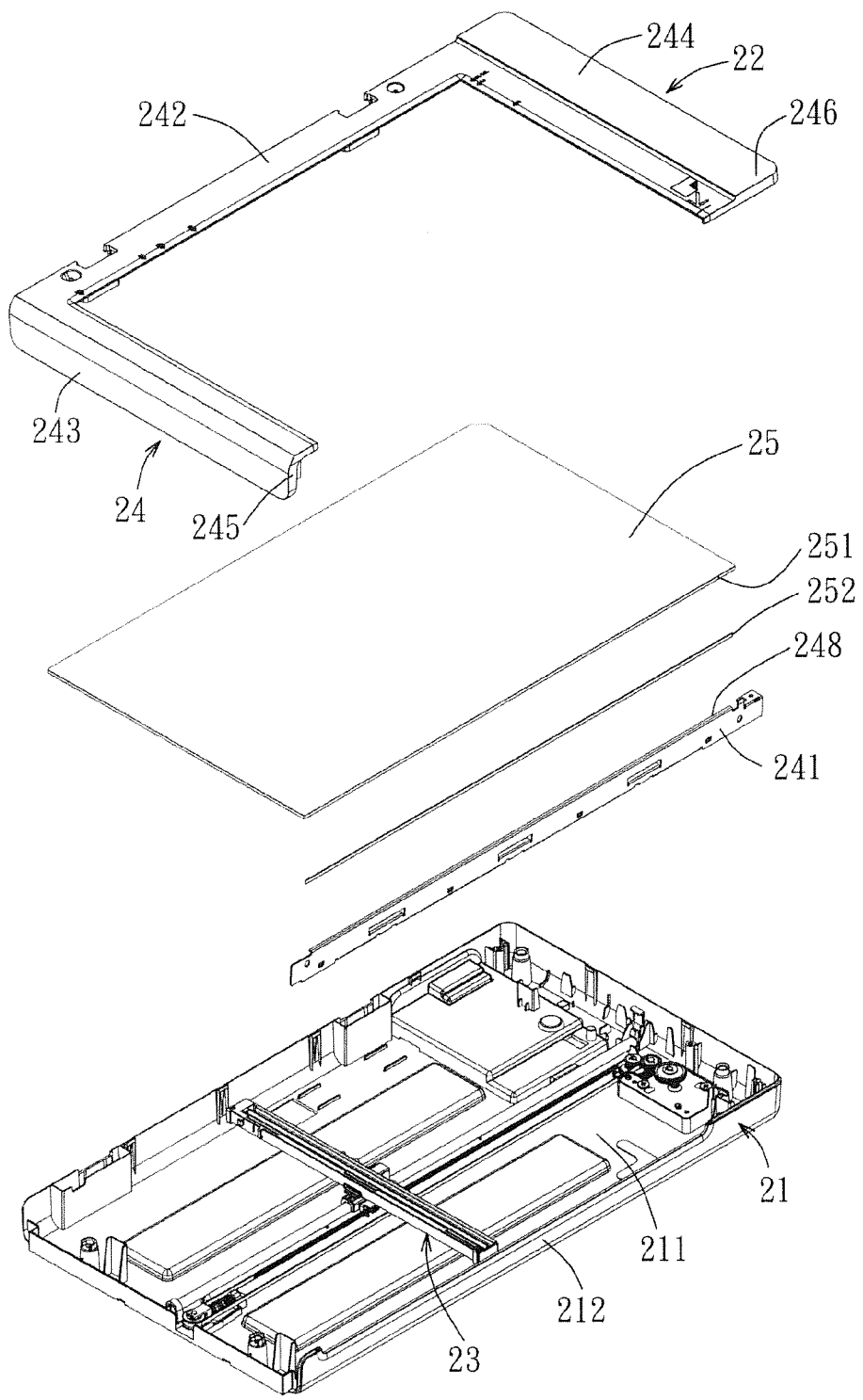
FIG. 4 is an exploded perspective view of the first preferred embodiment.
Figure 5:
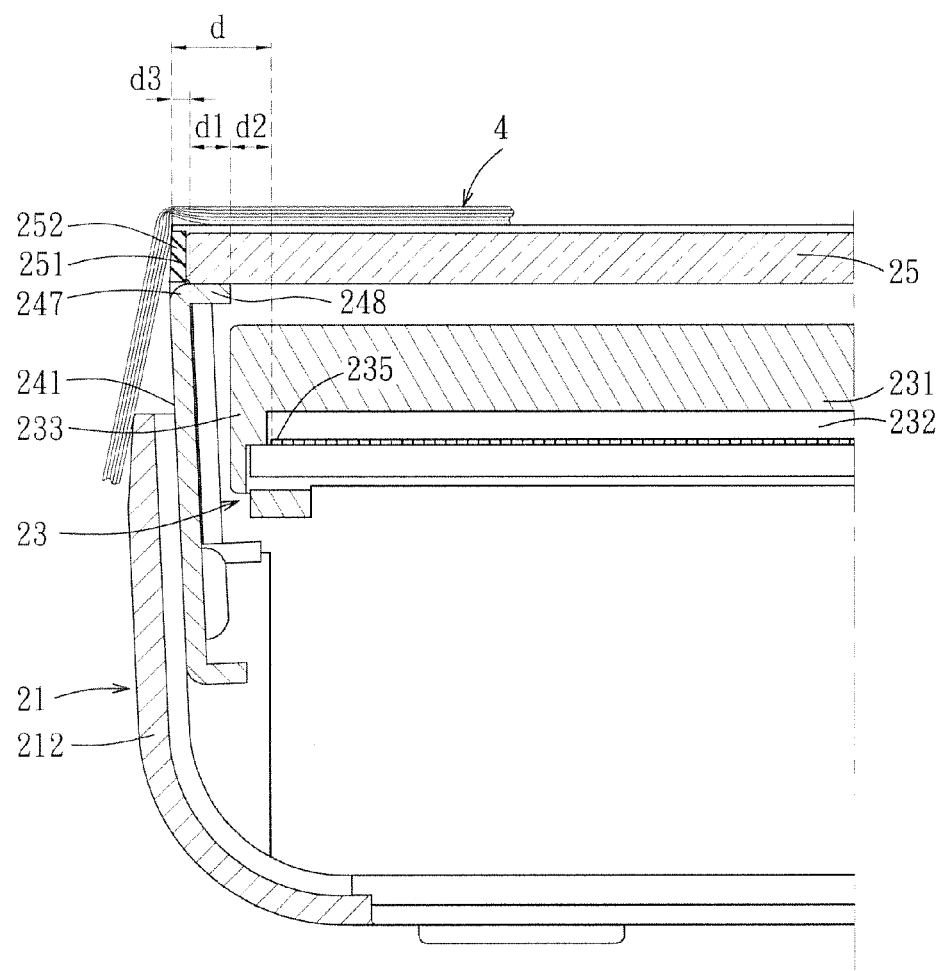
FIG. 5 is a fragmentary sectional view of the first preferred embodiment taken along line 5-5 of FIG. 3.

Referring to FIGS. 3 to 5, the first preferred embodiment of an image scanning device according to this invention is shown to comprise a base 21, a platform 22, and a contact image sensor (CIS) module 23.

The base 21 includes a bottom wall 211 and surrounding wall 212 extending upwardly from a peripheral edge of the bottom wall 211.

The platform 22 is mounted to and covers the base 21, and includes a frame 24 connected to the surrounding wall 212 of the base 21, and a transparent panel 25 fixed to the frame 24. The frame 24 includes a first side plate 241, a second side plate 242 oppositely parallel to the first side plate 241, and a third side plate 243 and a fourth side plate 244 oppositely parallel to each other and connected to and disposed between the first and second side plates 241, 242. The second, third and fourth side plates 242, 243, 244 are integrally formed as one piece from a plastic material and cooperatively define a generally U-shaped structure. The first side plate 241 is formed by aluminum extrusion or by processing a sheet metal. The first side plate 241 is an elongated plate having two opposite ends respectively fixed to free ends 245, 246 of the third and fourth side plates 243, 244.

The transparent panel 25 in this embodiment is a rectangular transparent glass, and has three lateral sides respectively fixed to inner surfaces of the second, third and fourth side plates 242, 243, 244. A fourth lateral side 251 of the transparent panel 25 is supported by an upper part 247 of the first side plate 241. As shown in FIGS. 4 and 5, the upper part 247 of the first side plate 291 has a support flange 248 that extends inwardly and horizontally from an upper end thereof and that extends along a length thereof. Because the fourth lateral side 251 of the transparent panel 25 is exposed, a decorative piece 252 may be adhered to the fourth lateral side 251 in order to enhance an appearance thereof.

Figure 6:
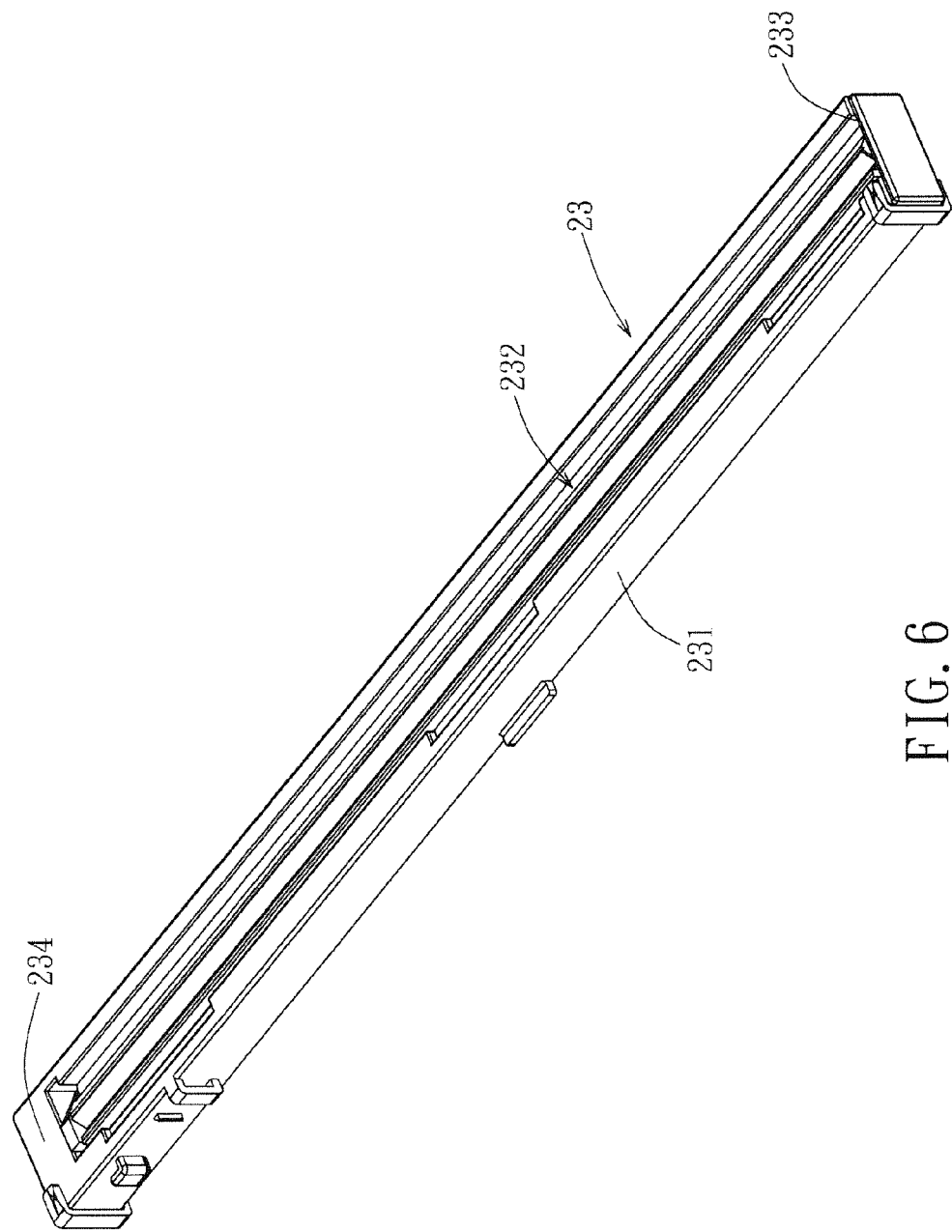
FIG. 6 is an enlarged perspective view of a contact image sensor module of the first preferred embodiment.

The CIS module 23 is disposed on the bottom wall 211 of the base 21, and is transverse to the first and second side plates 241, 242 of the frame 24. Referring to FIG. 6, in combination with FIG. 5, the CIS module 23 includes an elongated housing 231 and a sensor assembly 232 disposed in the housing 231. The sensor assembly includes a plurality of sensors 235 that are arranged in a row. The housing 231 has a first short side wall 233 proximate to the first side plate 241 of the frame 24, and a second short side wall 234 proximate to the second side plate 242 of the frame 24. An outer surface of the first short side wall 233 is spaced apart from an inner surface of the first side plate 241 by a first distance (d1) of about 1.95 mm. Further, the first short side wall 233 has a thickness smaller than that of the second short side wall 234. As such, a sensor 235 of the sensor assembly 232 which is closest to the first short side wall 233 is spaced apart from the outer surface of the first short side wall 233 by a second distance (d2) of only about 2.05 mm. Because the first side plate 241 is made of a hard and not easily deformed metal material, the thickness (d3) thereof may only be 1 mm for the first side plate 241 to provide a good supporting effect. Moreover, the support flange 248 of the upper part 247 of the first side plate 241 has a width less than or equal to the first distance (d1).

Figure 1:
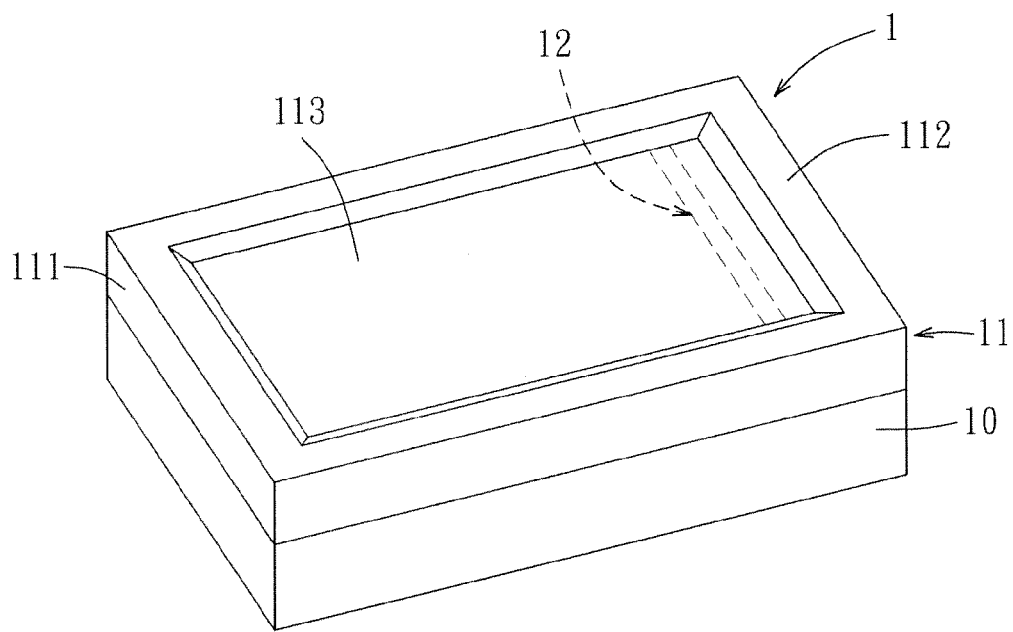
FIG. 1 is a perspective view of a conventional flatbed image scanning device.
Figure 2:
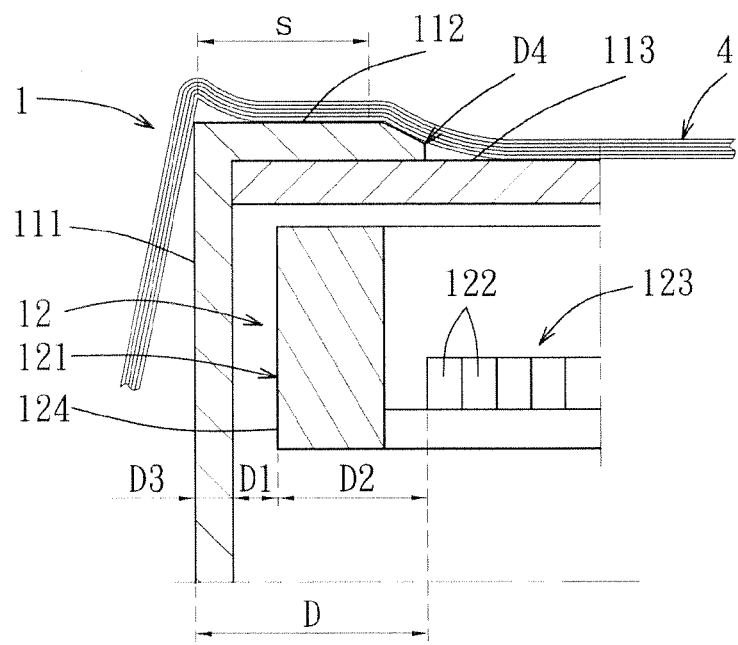
FIG. 2 is a fragmentary sectional view of the flatbed image scanning device of FIG. 1.

Through such a configuration, a distance (d) (see FIG. 5) from an outermost one of the sensors 235 of the sensor assembly 232 to the outer surface of the first side plate 241 is the sum of the first distance (d1), the second distance (d2) and the thickness (d3), and is about 5 mm. The distance (d) of the present invention is reduced by about 15 mm when compared to the distance (D) of the conventional flatbed image scanning device 1 shown in FIG. 2. Hence, as shown in FIG. 5, when a to-be-scanned page of a book 4 is laid flatly on the transparent panel 25, and a binding side of the book 4 abuts against the lateral side 251 of the transparent panel 25, because there is almost no sectional difference between the lateral side 251 of the transparent panel 25 and the first side plate 241, the to-be-scanned page can be completely laid flat against the transparent panel 25. Further, the position of the sensor assembly 232 is closer to the binding side of the to-be-scanned page of the book 4 as compared to that of the conventional flatbed image scanning device 1 (see FIG. 2). Thus, as long as a border of the content of the to-be-scanned page, which is proximate to the binding side, is spaced apart from the outer surface of the first side plate 241 of the frame 24 of the platform 22 by a distance greater than 5 mm, the content of the to-be-scanned page which is close to the binding side can all be scanned by the sensor assembly 232. Therefore, a scan margin of the image scanning device of this embodiment can be significantly shortened, and an effective scanning range thereof can be expanded.

Figure 7:
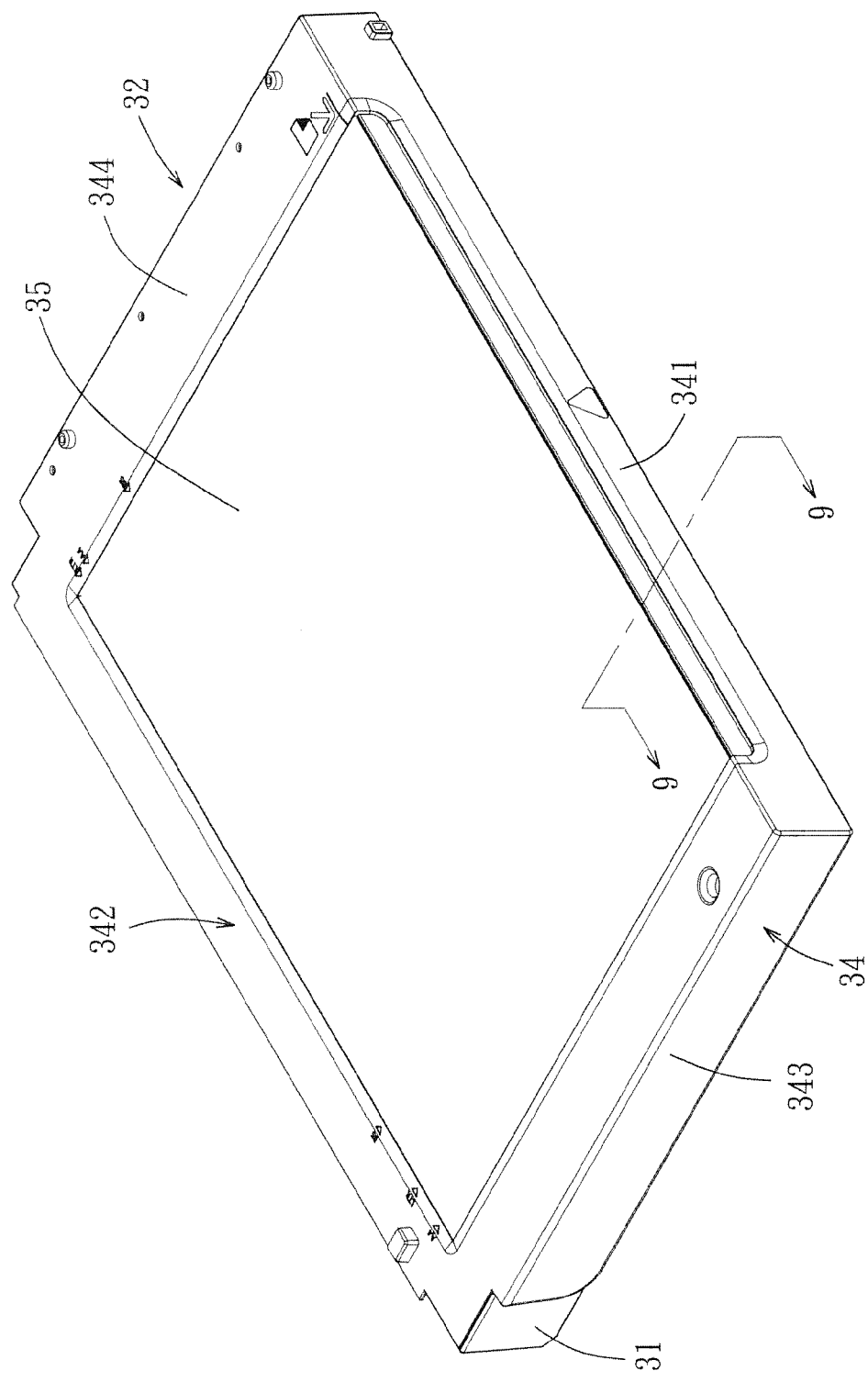
FIG. 7 is a perspective view of an image scanning device according to the second preferred embodiment of this invention.
Figure 8:
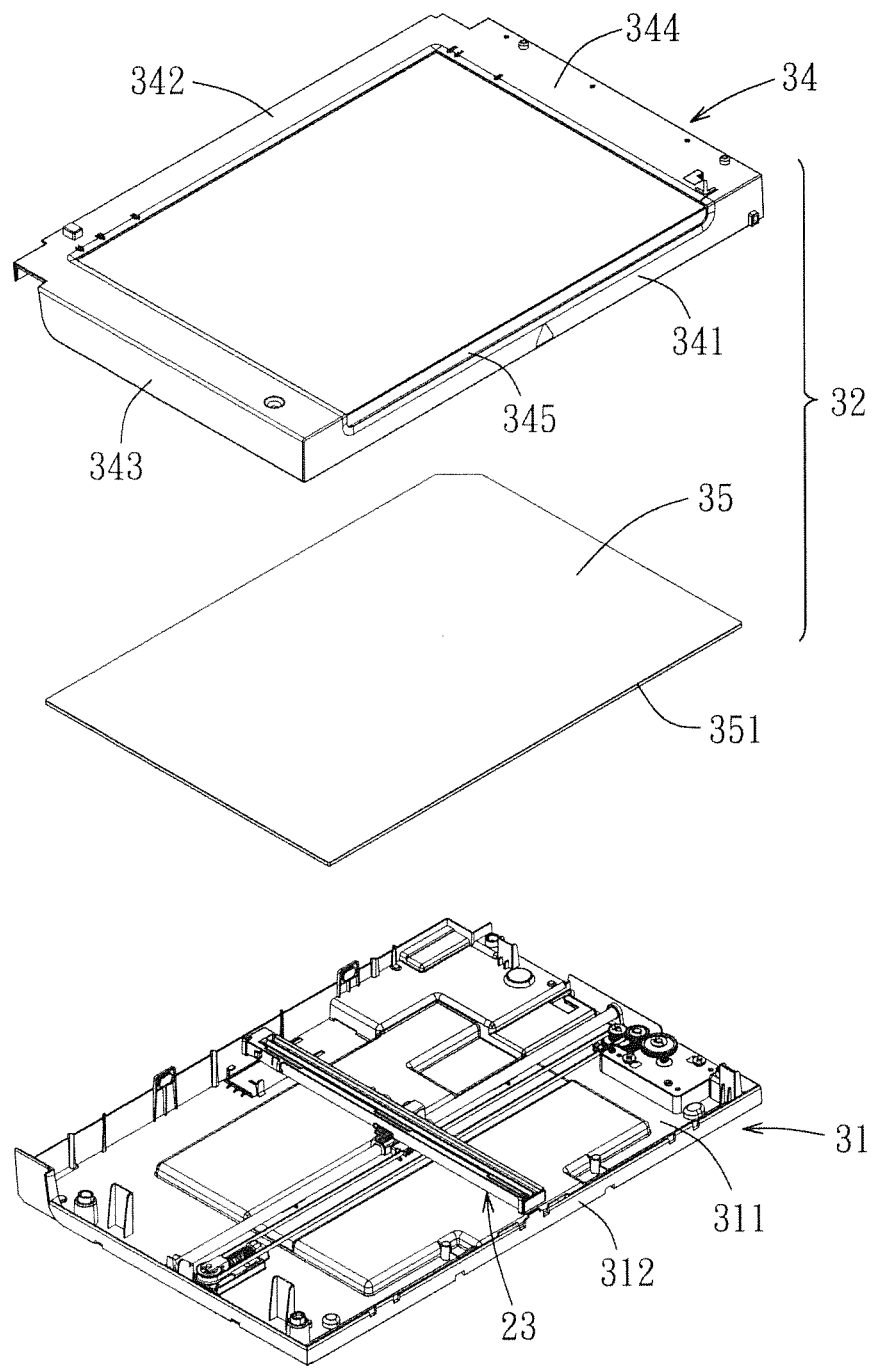
FIG. 8 is an exploded perspective view of the second preferred embodiment.
Figure 9:
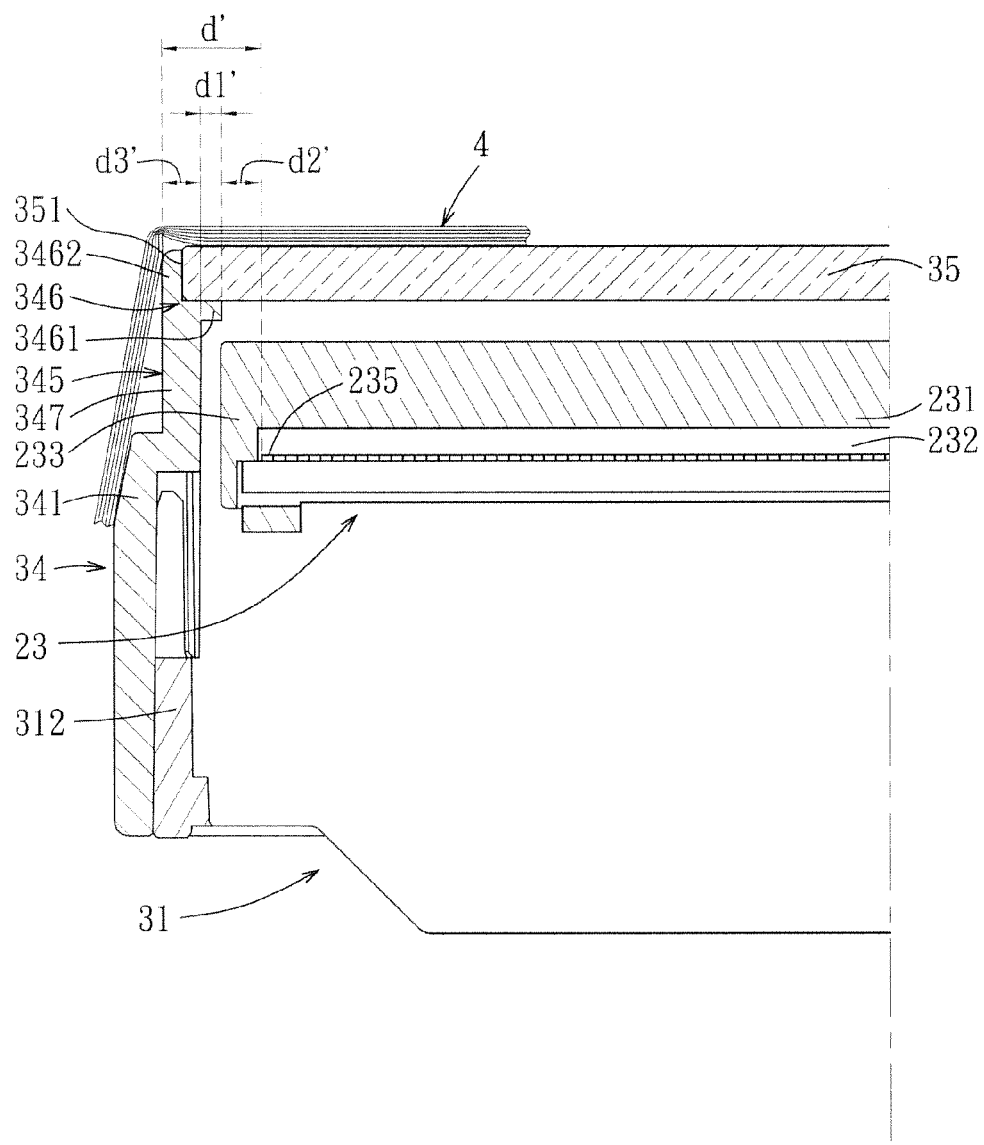
FIG. 9 is a fragmentary sectional view of the second preferred embodiment taken along line 9-9 of FIG. 7.

Referring to FIGS. 7 to 9, the second preferred embodiment of an image scanning device according to this invention is shown to be similar to the first preferred embodiment. Particularly, the image scanning device comprises a base 31 including a bottom wall 311 and a surrounding wall 312, a platform 32 mounted to and covering the base 31, and a contact image sensor (CIS) module 23 disposed on the base 31.

However, in this embodiment, the first side plate 341, the second side plate 342, the third side plate 343 and the fourth side plate 344 of the frame 34 of the platform 32 are integrally formed as one piece by a plastic material to form a rectangular structure. The first side plate 341 is an elongated plate. Each of the second, third and fourth side plates 342, 343, 344 has an inverted L-shaped cross section.

The transparent panel 35 has a structure similar to that of the transparent panel 25 described in the first preferred embodiment. That is, the transparent panel 35 is a rectangular transparent glass, and has three lateral sides respectively fixed to the inner surfaces of the second, third and fourth side plates 342, 343, 344 of the frame 34, and a fourth lateral side 351 supported by an upper part 345 of the first side plate 341. However, in this embodiment, as shown in FIG. 9, the upper part 345 of the first side plate 341 includes an upright connecting section 347 and a support section 346. The support section 346 has an L-shaped cross section, and has a horizontal plate 3461 connected to the upright connecting section 347, and a vertical plate 3462 extending upwardly from the horizontal plate 3461. The vertical plate 3462 has a height slightly less than or equal to the thickness of the transparent panel 35, so that there is almost no sectional difference between a top end of the vertical plate 3462 and a top surface of the transparent panel 35.

The CIS module 23 of this embodiment is identical to that described in the first preferred embodiment. However, in this embodiment, the first distance (d1') is measured from the outer surface of the first short side wall 233 of the housing 231 of the CIS module 23 to an inner surface of the upright connecting section 347 of the upper part 345 of the first side plate 341, and is only about 0.95 mm. The second distance (d2'), which is measured from the outermost sensor 235 (that is closest to the first short side wall 233) of the sensor assembly 232 to the outer surface of the first short side wall 233 is still at about 2.05 mm. Because the first side plate 341 is made of a plastic material so that the thickness thereof can be reduced to a minimum but still can provide a sufficient supporting force and does not easily deform, the upright connecting section 347 of the upper part 345 has a thickness (d3') of about 2 mm, and a lower part of the first side plate 341 has a thickness greater than 2 mm. Further, the vertical plate 3462 has a thickness smaller than that of the upright connecting section 347, and the horizontal plate 3461 has a width that is equal to the sum of the first distance (d1') and the thickness (d3'). As such, the horizontal plate 3461 and the vertical plate 3462 of the upper part 345 of the first side plate 341 can stably support the lateral side 351 of the transparent panel 35.

Through the aforesaid configuration, a distance (d') (see FIG. 9) from the outermost sensor 235 of the sensor assembly 232 to an outer surface of the upper part of the first side plate 341 is the sum of the first distance (d1'), the second distance (d2') and the thickness (d3'), and is about 5 mm. Similarly, the distance (d') of this embodiment is reduced by about 15 mm when compared to the distance (D) of the conventional flatbed image scanning device 1 (see FIG. 2). Hence, as shown in FIG. 9, when a to-be-scanned page of a book 4 is laid flatly on the transparent panel 35, and a binding side of the book 4 abuts against the lateral side 351 of the transparent panel 35, because there is almost no sectional difference between the lateral side 351 of the transparent panel 35 and the vertical plate 3462 of the support section 346 of the upper part 345 of the first side plate 341, the to-be-scanned page can be completely laid flat against the transparent panel 35. Further, the position of the sensor assembly 232 is closer to the binding side of the to-be-scanned page of the book 4 as compared to that of the conventional flatbed image scanning device 1 (see FIG. 2). Thus, as long as a border of the content of the to-be-scanned page, which is proximate to the binding side, is spaced apart from the outer surface of the upper part 345 of the first side plate 341 of the frame 34 of the platform 22 by a distance greater than 5 mm, the content of the to-be-scanned page which is close to the binding side can all be scanned by the sensor assembly 232. Similarly, a scan margin of the image scanning device of this embodiment can be significantly shortened, and an effective scanning range thereof can be expanded.

In summing up the image scanning device according to this invention, by shortening the distance (d1, d1') between the first short side wall 233 of the housing 231 of the CIS module 23 and the first side plate 241, 341 of the frame 24, 34 of the platform 22, 32, by shortening the distance (d2, d2') between the outermost sensor 235 of the sensor assembly 232 of the CIS module 23 and the first short side wall 233 of the housing 231 that is proximate to the first side plate 241, 341, and by reducing the thickness (d3) of the first side plate 241 or the thickness (d3') of the upper part 345 of the first side plate 341, the distance (d) between the outermost sensor 235 of the sensor assembly 232 and the first side plate 241 or the upper part of the first side plate 341 can be reduced to around 5 mm. The purpose of shortening the scan margin and expanding the effective scanning range of the image scanning device can thus be realized.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An image scanning device comprising:
  a base including a bottom wall and a surrounding wall extending upwardly from a peripheral edge of said bottom wall;
  a platform mounted to and covering said base, and including a frame connected to said surrounding wall and a transparent panel fixed to said frame, said frame including a first side plate, a second side plate opposing and parallel to said first side plate, and a third side plate and a fourth side plate opposing and parallel to each other and extending between said first and second side plates, said transparent panel having a lateral side supported by an upper part of said first side plate;
  a horizontal member disposed to extend horizontally inward from an upper end of said upper part of said first side plate, and a vertical member disposed to extend vertically upward from said upper end of said upper part, said horizontal and vertical members being offset in orientation by a substantially right angle to receive a bottom edge of the transparent panel therebetween in cradled manner; and
  a contact image sensor module disposed on said bottom wall transverse to said first side plate, and including a housing and a sensor assembly disposed in said housing, said housing having a first short side wall proximate to and spaced apart from said first side plate by a first distance less than or equal to 2 mm, and a second short side wall opposite to said first short side wall, said first short side wall being less in thickness than said second short side wall, said sensor assembly including a plurality of sensors arranged in a row, said sensors closest to said first short side wall being spaced apart from an outer surface of said first short side wall by a second distance less than or equal to 2.5 mm.

2. The image scanning device as claimed in claim 1, wherein said frame is integrally formed as one piece from a plastic material, said upper part of said first side plate having a thickness of less than or equal to 2 mm, said vertical member having a height less than or equal to a thickness of said transparent panel.

3. The image scanning device as claimed in claim 1, wherein said second, third, and fourth side plates are integrally formed as one piece from a plastic material and cooperatively define a generally U-shaped structure, said first side plate being formed by aluminum extrusion or processing a sheet metal, and having two opposite ends respectively fixed to free ends of said third and fourth side plates, said first side plate having a thickness of less than or equal to 1 mm, said horizontal member having a width less than or equal to said first distance.

* * * * *